Patented Feb. 21, 1939

2,148,106

UNITED STATES PATENT OFFICE 2,148,106

PROCESS OF PREPARING ARYL MERCAPTANS

John Elton Cole, Wilmington, Del., assignor to E. I. du Pont de Nemours & Company, Wilmington, Del., a corporation of Delaware No Drawing. Application December 9, 1937, Serial No. 178,929

6 Claims. (Cl. 260—609)

This invention relates to the manufacture of aryl-mercaptans. More particularly it relates to a method of producing aryl-mercaptans by forming first aryl-sulfinic acids and then converting these sulfinic acids to the corresponding mercaptans.

It has been shown by Knoevenagel (Ber. vol. 41, pp. 3315-31) that sulfur dioxide will react with aromatic hydrocarbons in the presence of aluminum chloride and carbon disulfide to form aluminum sulfinates. This author also disclosed that aluminum sulfinates could be converted to sodium sulfinates but his attempts to produce pure free sulfinic acids in good yield were unsuccessful. Havas has disclosed (U. S. Pat. No. 1,993,663 of March 5, 1935) that phenyl-mercaptans can be economically produced by reduction of the aluminum sulfinates produced according to Knoevenagel by a strongly acid zinc reduction. Both of these previous authors produce the aluminum sulfinates by passing anhydrous sulfur dioxide into a carbon disulfide solution of the aryl hydrocarbon. Knoevenagel alternatively produced the sulfinic acids by causing Freidel-Craft's reaction to take place in an excess of the aryl hydrocarbon. The process as carried out in this way is not altogether satisfactory and is, moreover, quite expensive because of the excess of aryl hydrocarbon.

This invention has as an object the economical commercial production of aryl-mercaptans. Another object of the invention is the economical production of aryl-sulfinic acids. Other objects will appear hereinafter.

These objects have been accomplished by reacting together an aryl hydrocarbon, aluminum chloride and liquid sulfur dioxide in the absence of diluents, the liquid sulfur dioxide being in excess. The reaction is preferably carried out at low temperatures. After the reaction is complete, the excess sulfur dioxide and by-product hydrogen chloride are removed. The excess sulfur dioxide may be recovered and used over again. When it is desired to produce the corresponding mercaptan, the aryl-aluminum-sulfinate is reduced with a strong mineral acid in the presence of a metal or metal compound capable of liberating hydrogen from acid solution by the method disclosed by Havas (U. S. Pat. No. 1,993,663).

In order that the invention may be more fully understood, the following examples are set forth. These examples are merely illustrative and the invention is not limited thereto as will become more fully apparent hereinafter. In the examples, the quantities of materials are all given as parts by weight.

Example I

A cool, dry, iron autoclave was charged with 140 parts of chlor-p-xylene and 160 parts of anhydrous aluminum chloride. To this mixture was added 300 parts of anhydrous sulfur dioxide under pressure. This mixture was agitated at 0° C. for 8 hours and then at ordinary temperature for 12 hours. At the end of this time, the by-product hydrogen chloride and excess sulfur dioxide were removed by evaporation during agitation. The crude white powder was removed from the autoclave and stirred vigorously with 1500 parts of cold water to remove residual sulfur dioxide and hydrogen chloride. The insoluble purified white chlor-p-xylyl-aluminum-sulfinate was isolated by filtration and washed with cold water. This product was stirred with 500 parts of commercial hydrochloric acid (20° Bé.) This mixture was heated to about 90° C. and zinc dust was added slowly to complete reduction (approximately 130 parts of zinc dust was required). The crude chlor-p-xylyl-mercaptan was isolated in excellent yield by cooling followed by filtration and washing.

Example II

Naphthalene in the amount of 256 parts was added to 2700 parts of liquid sulfur dioxide at −20° C. To this solution was added slowly 266 parts of anhydrous aluminum chloride while holding the temperature at −20° C. This mixture was agitated for five hours, during which time the temperature rose slowly to +5° C. and hydrogen chloride was evolved. The excess sulfur dioxide was recovered by distillation and the residue was stirred with cold water. The naphthyl-aluminum-sulfinate was isolated by filtration.

The naphthyl-aluminum-sulfinate was reduced to the mixed naphthyl-mercaptans by zinc dust and hydrochloric acid as indicated in Example I. The yield was 70% of the theoretical calculated from naphthalene.

Example III

Benzene in the amount of 156 parts was dissolved in 1000 parts of liquid sulfur dioxide at approximately −10° C. To this solution was added 267 parts of anhydrous aluminum chloride during a fifteen minute period. The charge was held at −6 to −15° C. for 7 hours. The excess sulfur dioxide was removed by distillation and the mass acidified with concentrated hydrochloric acid.

The filter cake, containing the aluminum complex salt of the benzene sulfinic acid, was slurried with water, and made alkaline to Brilliant Yellow with solid soda ash at 45±5° C. After filtering off the aluminum hydroxide, the filtrate was evaporated under vacuum at below 60° C. to a volume of approximately 800 parts. The concentrated solution was cooled to 0° C., and acidified with concentrated hydrochloric acid until precipitation was complete. The product was filtered off, washed twice with ice water and dried in vacuum. The product had a melting range of 79–81° C.

*Example IV*

A dry, cold iron autoclave was charged with 100 parts of anhydrous aluminum chloride and 300 parts of sulfur dioxide. This mixture was cooled to 0° C. and 100 parts of crude dry chlornaphthalene dissolved in 300 parts of sulfur dioxide was added slowly while cooling in a closed system. The reaction mixture was agitated 8 hours, during which time the pressure rose slowly, due to evolution of hydrogen chloride, to 150 pounds. The excess sulfur dioxide and by-product hydrogen chloride were removed by distillation and the crude product was removed from the autoclave. It was suspended in cold water and isolated from the aqueous suspension by filtration. This product was reduced by zinc and hydrochloric acid as in Example I. An excellent yield of mixed chloro-naphthyl-mercaptan (chlor-mercapto-naphthalene) was obtained.

The process of the invention may be carried out within wide limits of temperature and pressure. However, low temperatures are preferred and the range between −10° C. and +30° C. has been found especially desirable. The pressure may be varied between atmospheric pressure and 300 pounds (gauge). In general, it has been found that economy of sulfur dioxide can be obtained by greater than atmospheric pressure and it is therefore preferred to carry out the making of aryl-aluminum-sulfinates under pressure. In any case, the temperature and pressure should be so correlated that the sulfur dioxide is in the liquid state.

The aryl hydrocarbons suitable for this invention comprise members of the benzene, naphthalene and anthracene series. These compounds may be substituted by halogen. Anthraquinone is within the scope of the invention. Unsubstituted and halogen substituted hydrocarbons of the benzene and naphthalene series are preferred and especially preferred are low molecular weight unsubstituted and chlorine substituted members of the benzene and naphthalene series. These low molecular weight compounds comprise benzene, naphthalene and benzene and naphthalene having 1 to 4 alkyl groups, the carbon atoms of the alkyl group totaling not more than 8 carbon atoms. These especially preferred compounds may also be halogen, preferably chlorine substituted. They must, of course, have at least one hydrogen atom on an aryl carbon atom for the reaction to occur.

It is preferred that the aluminum chloride be present in substantially equi-molar proportions with the aryl hydrocarbon in order to produce the maximum yields. The process is, however, operative with other proportions.

The process of making aryl-sulfinic acids according to the present invention is carried out with an excess of liquid sulfur dioxide. The excess of one reactant is desirable to produce good yields. In the prior art as shown by Knoevenagel, (loc. cit.) an excess of aryl hydrocarbon is used. This involves additional expense and in some cases would be absolutely impractical since some hydrocarbons of the class herein disclosed are solids at the preferred reaction temperatures. Nevertheless, excess sulfur dioxide has been avoided by the prior art, probably because it appeared that such excess would produce additional and undesirable sulfination. The process of the present invention does not produce this expected additional sulfination but on the contrary results in good yields of the desired product.

The excess of liquid sulfur dioxide has another function. It acts as a solvent for the reaction, no other solvent or diluent being used in the process of the present invention. It thus presents distinct advantages over prior art methods involving the use of carbon disulfide as a solvent for the reaction, sulfur dioxide being present in the gaseous state under the pressure and temperature conditions of such prior art methods. The commercial expense and hazards involved in the handling of carbon disulfide are well known to contribute to increased manufacturing expense as well as increased industrial hazards.

Methods of producing aryl-mercaptans which involve decomposition of diazo compounds to form intermediate sulfur compounds from which mercaptans are obtained by hydrolysis give products which are inferior in purity. For important uses of the mercaptans, for example, their uses in pharmaceuticals and in the field of rubber chemicals, these impurities are particularly objectionable. It is, therefore, desirable to obtain aryl-mercaptans by a reduction process from the corresponding aryl-sulfinic acid, since this procedure gives superior products, especially with regard to purity. Since the present invention provides an advance in making aryl-sulfinic acids, it also provides an improved method of obtaining aryl-mercaptans.

The production of aryl-mercaptans by reduction of the aryl-aluminum-sulfinates made as hereinbefore described is quite satisfactorily carried out by the zinc dust and hydrochloric acid method set forth in the specific examples. However, other reducing agents which can be used in acid solution may be substituted for zinc. For example, it has been found that satisfactory results may be obtained by substituting iron for all or part of the zinc. The hydrochloric acid may be replaced by sulfuric acid of corresponding strength and the concentration of the acid may be varied within reasonable limits so long as fairly concentrated acid is used. In general, it may be stated that the reduction can be carried out with a strong mineral acid in the presence of a metal or metal compound capable of liberating hydrogen from acid solution.

Aryl-mercaptans have many uses, among which may be mentioned their use in pharmaceuticals, in rubber chemicals, in the manufacture of dyes, and as insecticides.

Suitable changes may be made in the details of the process and any modifications or variations which conform to the spirit of the invention are intended to be included within the scope of the claims.

I claim:

1. A process of preparing aryl-mercaptans which comprises reacting an aryl compound with aluminum chloride and an excess of liquid sulfur dioxide and treating the product so produced with a strong mineral acid in the presence of a member of the group consisting of metal and metal compounds capable of liberating hydrogen from acid solution.

2. A process of preparing aryl mercaptans which comprises reacting unsubstituted and halogen substituted hydrocarbons of the benzene and naphthalene series with aluminum chloride and an excess of liquid sulfur dioxide at low temperatures and treating the resulting aryl-aluminum-sulfinate with a strong mineral acid in the presence of a member of the group consisting of metal and metal compounds capable of liberating hydrogen from acid solution.

3. A process of preparing aryl mercaptans which comprises reacting an aryl compound of the group consisting of low molecular weight unsubstituted and chlorine substituted members of the benzene and naphthalene series with an equimolar amount of aluminum chloride and an excess of liquid sulfur dioxide at low temperatures and treating the resulting aryl-aluminum-sulfinate with hydrochloric acid and zinc dust to produce the corresponding aryl-mercaptan.

4. A process which comprises reacting an aryl compound of the group consisting of unsubstituted and chlorine substituted members of the aryl series with aluminum chloride and an excess of liquid sulfur dioxide at low temperatures to produce an aryl-aluminum-sulfinate.

5. A process which comprises reacting a compound of the group consisting of unsubstituted and chlorine substituted members of the benzene series with aluminum chloride and an excess of liquid sulfur dioxide at low temperatures to produce a phenyl-aluminum-sulfinate.

6. A process which comprises reacting a compound of the group consisting of unsubstituted and chlorine substituted members of the naphthalene series with aluminum chloride and an excess of liquid sulfur dioxide at low temperatures to produce a naphthyl-aluminum-sulfinate.

JOHN ELTON COLE.